W. B. HODGE.
DEVICE FOR PROTECTING END BEARINGS.
APPLICATION FILED APR. 8, 1907.
919,171.
Patented Apr. 20, 1909.
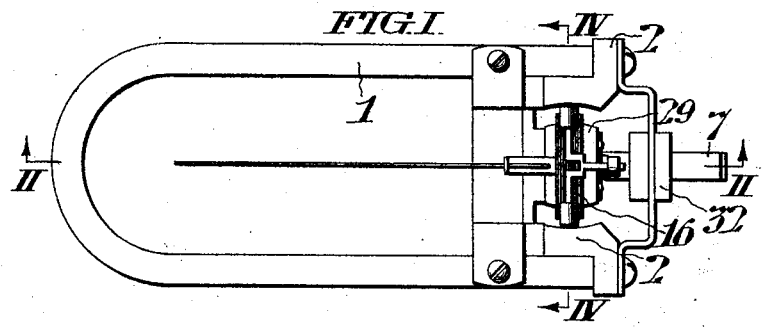
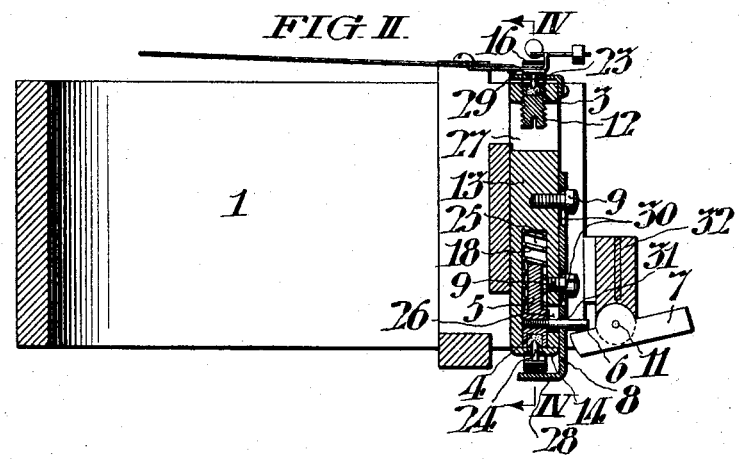
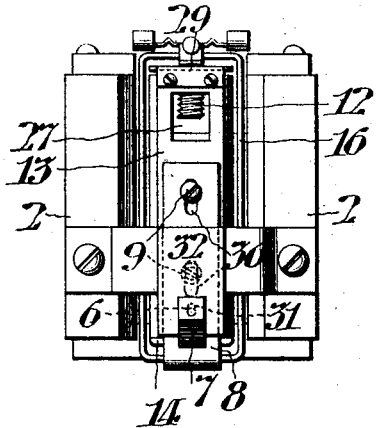
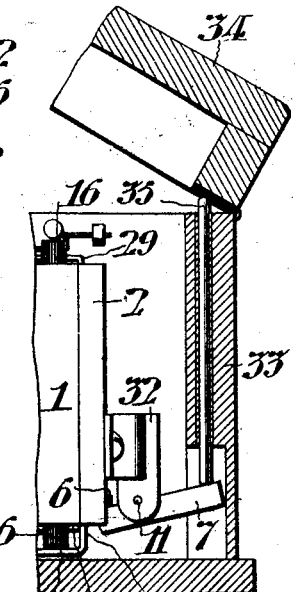
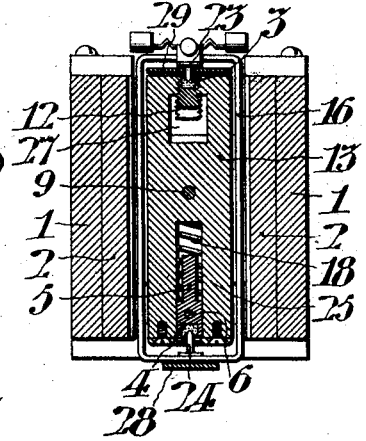
WITNESSES:
John C. Bergner
Wm J. Sperl
INVENTOR:
WILLIAM B. HODGE,
By May & Paul
attorneys.

UNITED STATES PATENT OFFICE.

WILLIAM B. HODGE, OF GLENSIDE, PENNSYLVANIA, ASSIGNOR TO QUEEN & CO., INCORPORATED, OF PHILADELPHIA, PENNSYLVANIA, A CORPORATION OF PENNSYLVANIA.

DEVICE FOR PROTECTING END BEARINGS.

No. 919,171.  Specification of Letters Patent.  Patented April 20, 1909.

Application filed April 8, 1907. Serial No. 366,958.

*To all whom it may concern:*

Be it known that I, WILLIAM B. HODGE, of Glenside, in the county of Montgomery and State of Pennsylvania, have invented certain new and useful Improvements in Devices for Protecting End Bearings, whereof the following is a specification, reference being had to the accompanying drawings.

My invention is especially adapted for use in connection with the end bearings of delicate moving systems, such, for instance, as those employed in electrical and magnetic apparatus, where extreme sensibility is required on account of the delicate nature of the measurements to be indicated and the relatively small moving force which is available. Ordinarily, in instruments of this character, sharpened pivots are employed whose reduced ends are supported upon hard polished surfaces, such as steel or jewels. Owing to the exceedingly delicate character of the bearing points and the high degree of polish which should be maintained at the surfaces engaging them, the transportation of instruments of this construction is attended with much danger, since the dulling of the pivot itself or the roughening of the jewel through accidental shock may seriously impair the mobility of the system and be productive of substantial error in its operation.

Since the most obvious embodiment of my invention is in connection with electrical measuring instruments, I have, in the accompanying drawings, represented it as applied to an ordinary D'Arsonval instrument of a well-known type, but it must, of course, be understood that it can be employed in connection with any other moving system which embodies two end bearings of the same general character.

Figure I, represents a plan view of the essential parts of said D'Arsonval instrument having my invention applied thereto. Fig. II, is a longitudinal section on the plane indicated at II, II, in Fig. I. Fig. III, is a view in elevation of the end which is represented at the right in Figs. I and II. Fig. IV, is a vertical transverse section on the plane indicated at IV, IV, in Figs. I and II. Fig. V, shows a partial view, in side elevation, of the end which is to the right in Figs. I and II, partly indicating in vertical section the adjacent portion of the box, in which the apparatus may be inclosed, and showing a convenient means of actuating the moving parts.

In said figures, the permanent magnet is represented at 1, the curved pole faces at 2, 2, the core at 13, and the rotatable coil at 16. This coil, together with certain adjunctive parts carried thereby, constitutes the movable system of the particular apparatus now described, and it is normally supported upon end bearings, comprising the pivots 23 and 24, and the jewels 3 and 4, the latter being provided with sockets, as shown, to receive the sharpened ends of the pivots. In this instance the pivots 23 and 24, are the rotating elements of the bearings, since they are attached to and rotate with the coil, while the jewels 3 and 4 are the stationary elements of the bearings. The upper jewel 3, is mounted in the end of a screw stud 12, whose slotted head extends into an open recess 27, formed near the upper extremity of the core 13, so as to afford access to the screw for vertical adjustment of the stud. When the jewel 3 has been adjusted in a given position, it may be considered as functionally a fixed element. The lower jewel 4, is functionally an axially movable element and for that purpose is mounted in the end of a cylindrical stud 5, which fits snugly, but freely, in a cavity 25, in the lower end of the stationary core 13, the reduced upper portion of said stud being surrounded by a spiral spring 18, which is seated within said cavity.

A face plate 14, having a small central hole, is secured to the lower end of the core 13, and thus retains the stud 5 and jewel 4, within the cavity, against the tension of the spring 18. The lower pivot 24, passes through said hole in the face plate 14. The pin 6, is secured transversely in the stud 5, and extends laterally out through a slot 26, formed in the adjacent lower portion of the core 13. A shifting frame 8, is movably supported upon the exterior face of the core piece 13, said frame having an inwardly projecting lower end portion 28, which extends immediately below the under surface of the lower end of the coil 16. A guide plate 29, is mounted at the upper extremity of the core 13, and extends horizontally between the upper end of the core, and the proximate inner surface of the upper end of the coil 16. This guide plate 29, is perforated to permit the free passage of the upper pivot 23. The frame 8, is movably supported in contact with the face of the core 13, by means of screws 9, which extend freely through vertical slots 30, formed in said frame, so as to permit vertical or endwise movement of the frame with relation to the core. The frame is also slotted at 31, to permit the lateral protrusion of the stud 6, but said slot is, as shown, of very small vertical extent, so that only a slight relative movement of the pin 6, with relation to the frame is permitted, while a more extended vertical movement of the frame with relation to the core 13, is permitted by reason of the greater length of the slots 30.

A lever 7, is mounted upon a fulcrum pin 11, supported in a fixed bracket 32, the inner extremity of said lever being in operative relation to the protruding end of the pin 6, so that when the outer end of the lever is depressed, said pin will be raised.

In the embodiment shown in Fig. V, 33 represents one end of the box in which the instrument is inclosed, 34 being the hinged lid or cover. A vertical rod 35, is mounted to slide freely in the end of the box, the lower end of said rod being arranged in operative relation to the outer end of the lever 7, and the length of the rod being such that when the lid 34 is shut down, the rod 35 will depress the outer end of the lever to the extent desired. Whether thus actuated or otherwise, the operation of the device is as follows:—When the outer end of the lever 7, is depressed, its inner end lifts the pin 6. The first effect of this action is to shift the stud 5, vertically with relation to the core piece 13, thus lifting the jewel 4, away from the lower pivot 24. The extent of this movement, however, is slight, since the pin 6, soon comes in contact with the upper limit of the slot 31. Thereupon, said pin engages with the frame 8, and the further upward movement of the inner end of the lever 7, will consequently lift said frame bodily to an extent which may correspond with the extreme length of the slot 30, and will continue to lift the stud 5 and jewel 4. The inwardly projecting end 28 of the frame 8, is, by this upward movement, caused to engage with the under surface of the lower end portion of the coil 16, and as the upward movement of the frame continues, the coil will be bodily lifted, carrying with it the pivot 23, which is thus removed from contact with the upper jewel 3. The lower pivot is, of course, also lifted, but by reason of the continued withdrawal of its jewel will not reëngage therewith. The upward movement of the frame 8, also finally results in the clamping of the lower end portion of the coil 16, against the outer face of the plate 14, which is secured at the lower end of the core 13, so that the coil will be firmly held against displacement when in its lifted position. When the coil has been thus shifted, both of its end bearings will have ceased to be in engagement, by reason of the withdrawal of the lower jewel from the region of its co-acting pivot and conversely by the withdrawal of the upper pivot from the region of its co-acting jewel. The moving system (in this instance, the coil) is, during this period of mutual withdrawal of the pivots and bearings, supported by means of the frame 8, and in the full embodiment above described, this support involves the further feature of clamping the coil in a fixed position during the period of separation. Under these circumstances, the end portion of the pivots 23 and 24, and the bearing faces of the jewels 3 and 4, are absolutely protected against the risk of accidental injury in transportation or otherwise. In order to restore the parts to their working positions, it is only necessary to permit the outer end of the lever 7, to rise into its normal position, which action of course may be effected by the resiliency of the spring 18, which will tend to throw the stud 5, and consequently the pin 6, downward. Said pin in its descent will engage with the frame 8, and will shift it downward so as to permit the descent of the coil, the result being finally to cause reëngagement between the jewels 3 and 4, and their respective pivots.

In describing the foregoing embodiment, it will be noted that certain terms are used, such as "vertical" and "horizontal," which are appropriate in connection with the particular device under consideration, and it will also be noted that the preferred arrangement in this particular embodiment involves the longitudinal movement of one jewel with relation to its pivot, and the longitudinal movement of the other pivot with relation to its jewel. In order to avoid any implied limitation as to the scope of the claims, I now call attention to the fact that these features are, in a certain sense, accidental, and that I contemplate obvious modifications within the principle of my invention, which depends upon relative axial movement of the bearing members, irrespective of the selection of certain particular elements as the moving ones. I use the word "jewels," in my claims, as a convenient comprehensive term for the elements which afford seats for the ends of the pivots, but, of course, do not thereby imply that any particular material shall be employed, nor that the form of said elements shall be restricted. I further desire to state that I am aware that it is not broadly new to provide a clamping device for a pivotally mounted structure. In certain old forms of magnetic compasses and moving coil instruments, it has been common to support the system upon a single pivot and to provide means for lifting the moving element away from said pivot. The conditions, however, in such single pivoted instruments are entirely different from those which obtain in the class to which my invention relates, since in the latter there are pivotal supports at both ends. In these latter systems the mere lifting of the moving member away from one pivot, would, of course, result in excessive pressure between the other pivot and its opposing bearing surface, so that the problem in the case of the double-pivot instrument is essentially a different one.

I claim—

1. In a system comprising a rotatable member normally supported upon end bearings, the combination with said member and its bearings; of means for axially shifting said member and its attached bearing elements and for shifting a non-rotating element of the bearings; and means for automatically returning the bearing elements to their normal position.

2. In a system comprising a rotatable member normally supported upon end bearings; the combination with said member and its bearings; of means for axially shifting said member and its attached bearing elements and for shifting a non-rotating element of the bearing; means for clamping the rotatable member in its shifted position; and means for automatically returning the bearing elements to their normal position.

3. The combination of a rotatable member; pivots axially arranged upon said member; jewels adapted to engage said pivots; an axially movable seat for one of said jewels; and means comprising a pin and slot connection for axially shifting said seat and its jewel and for axially shifting the movable member and its pivots, the range of axial movement of said jewel being greater than the range of axial movement of the corresponding pivot.

4. The combination of a rotatable member; pivots axially arranged upon said member; a fixed support comprising an abutment; jewels in said support; an axially movable seat for one of said jewels; a frame adapted to engage the rotatable member and axially shift it; and means arranged to first shift said seat and its jewel, and then engage the frame to clamp the rotating member against said abutment.

5. The combination of a rotating member; pivots axially arranged upon said member; a fixed support; jewels mounted in said support; an axially movable seat for one of said jewels; a frame mounted to slide with relation to said support and adapted to engage said rotating member, said frame being provided with a slot of less extent than its own range of movement; a pin connected with said jewel-seat and extending through said slot; and means for shifting said pin in the direction of the axis of the pivots, whereby a relatively slight movement of said pin with relation to said frame is permitted and said frame may be shifted with relation to said support.

6. The combination of a rotatable member; axial pivots arranged upon said member; a fixed support, provided with an axial cavity; a spring actuated stud mounted in said cavity; a jewel carried by said stud; a jewel mounted at the other end of said support; a frame movably mounted upon the face of said support; said frame having a slot of less extent than the range of said movement; a pin connected with said stud and extending through said slot; and means for shifting said pin in the direction of the axis of said pivots.

In testimony whereof, I have hereunto signed my name, at Philadelphia Pennsylvania this twenty-eighth day of March 1907.

WILLIAM B. HODGE.

Witnesses:
JAMES H. BELL,
E. L. FULLERTON.